May 10, 1966
H. H. FLEETMAN
3,250,996
EXTENDED SCALE ELECTRICAL METER WITH
MOTION MULTIPLYING FLEXIBLE COUPLING
Filed Dec. 14, 1964
2 Sheets-Sheet 1
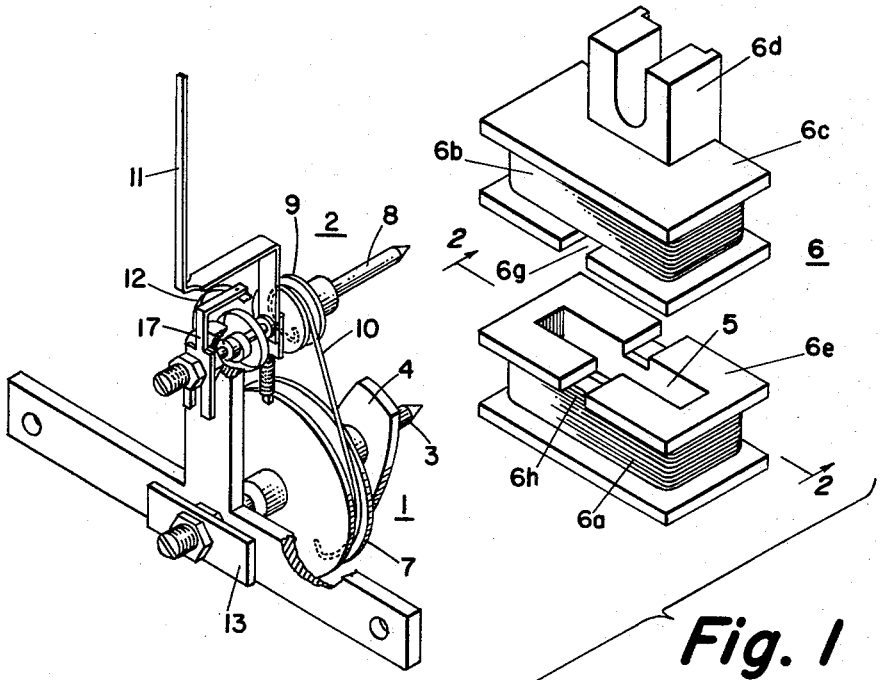
Fig. 1
Fig. 2
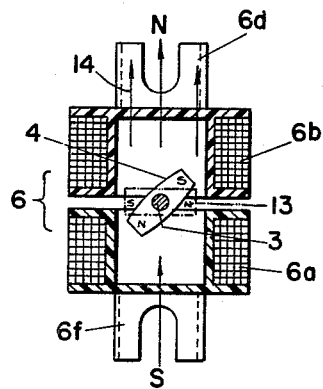
Fig. 3
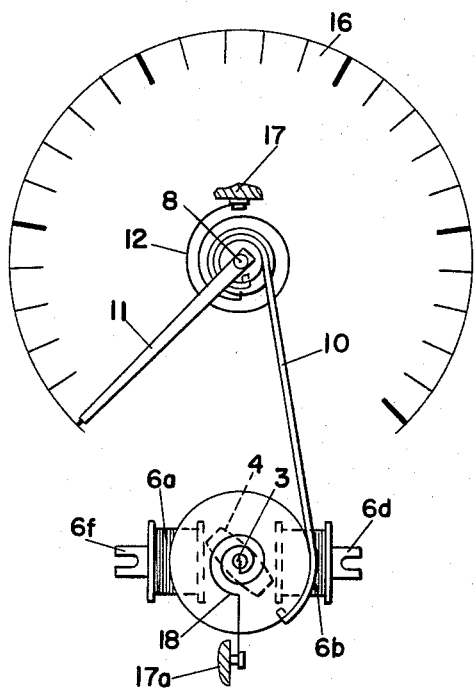

May 10, 1966  H. H. FLEETMAN  3,250,996
EXTENDED SCALE ELECTRICAL METER WITH
MOTION MULTIPLYING FLEXIBLE COUPLING
Filed Dec. 14, 1964

United States Patent Office 3,250,996
Patented May 10, 1966

3,250,996
EXTENDED SCALE ELECTRICAL METER WITH MOTION MULTIPLYING FLEXIBLE COUPLING

Hobart H. Fleetman, Perkasie, Pa., assignor to Electro-Mechanical Instrument Co., Perkasie, Pa.
Filed Dec. 14, 1964, Ser. No. 418,151
9 Claims. (Cl. 324—146)

This invention relates to long-scale electrical meters and more particularly to a method and means for preventing erratic indications of a pointer, particularly at the start of the scale reading of such a meter.

Though meters of the long-scale type have long been known to those skilled in the art, nevertheless if both sensitivity and increased scale length are to be achieved, theremust be solved the problem of preventing erratic indications of the pointer, particularly near the zero mark on the scale. This problem is particularly acute if there be utilized a belt-drive together with multiplying pulleys to increase the extent of movement of the pointer for a given rotation of the driving pulley of larger diameter.

In accordance with the present invention, the driving cord is connected between the driven member or pulley of smaller diameter and a driving member or pulley of large diameter. In order to prevent erratic indications of the pointer, the cord is maintained in tension in a particular way. Thus, restoring means are provided for the driven arbor used for driving the pointer along the scale. This restoring means may be in the form of a hairspring which develops a finite force or torque on the driven arbor, tending to move the pointer to its zero position. Associated with the driving arbor is a tensioning means which may be in the form of a hairspring or it may be in the form of permanent magnets which cooperate one with the other. The tensioning means applies a tensioning force to the driving arbor which just balances the restoring force applied to the driven arbor when the pointer is in the zero position. In this manner, the cord is maintained under tension, and the tensioning means associated with the driving arbor applies the tensioning force to the driving cord in the same direction as the pointer is to move. In this manner, there is overcome the possibility of any slack on the cord, and there is also present a force which aids in overcoming and does overcome the resistance of the cord to the bending required of it around and about the driving member or pulley.

Further in accordance with the invention, the application of the restoring force to the pulley of smaller diameter means that this restoring force as it appears or is applied to the driving pulley is multiplied by the ratio of the diameters of the driven and driving pulleys. Thus there is a multiplication of the restoring torque on the driven arbor as it is applied to the driving arbor, which means that there will be required the same ratio of increase in the balancing force which applies the tension to the cord and thus overcomes the tendency to produce erratic movement of the pointer as it leaves its zero position on the scale.

By reason of the multiplying action achieved by the two driving members, interconnected solely by the driving cord, it will be seen at once that there has been avoided the need of precise gearing, and also there has been avoided the development of unexpected friction as can occur with dirt or other foreign substances in fine gearing required for multiplying actions. Moreover, while the driving and driven members have also been referred to as pulleys, it will be understood that by changing the contour they can be utilized to change the scale characteristics and that scales of different kinds may be utilized, though ordinarily linear scales may be preferred. Additionally, while the expanded scale may be as great as 270°, greater or less arc of travel of the pointer may be provided by simply changing the ratio as between the driving and driven members.

The foregoing provisions make possible the use of a driving mechanism which need develops torque for movement of the driving member through a relatively small arc for a 270° deflection, or more, of the needle. Thus, while a driving mechanism may be satisfactory for operation over, say, 50°–70°, by utilizing the multiplying means of the present invention, the full 270° deflection may be obtained with only about 68° movement of the driving mechanism. If there should arise any stretching or slack of the cord due to change in temperatures, or the like, the meter will readily hold its calibration at zero, that is, the driving cord is kept taut on the driving pulley due to the action of the tensioning magnet. This uses up a part of the deflecting capability; nevertheless, there is an adequate reserve so that the operation of the meter will not be affected in any way.

More specifically, there may be utilized a low cost, inexpensive permanent magnet type of drive, the permanent magnet being attached to the driving arbor with suitable means for developing a magnetic field for the driving permanent magnet, thereby to apply a torque to the driven member for movement of the pointer on the scale. In one form of the invention, this means for producing the actuating magnetic field may be in the form of a coil, or a pair of them, in which the driving magnet may be mounted for development of maximum torque for a given current flow.

Finally, while the hairspring has been mentioned as applied to the driven arbor, it is to be understood that both the tensioning force and the restoring force may be developed by the interaction of magnetic fields which are effective throughout the movement of the pointer along the scale. In this case the movement of the driven arbor is limited to less than 180°.

For further objects, features and advantages of the invention, reference is to be had to the following detailed description taken in conjunction with the accompanying drawings, in which:

FIG. 1 is an exploded view of selected parts of a meter better to disclose the principles of this invention;

FIG. 2 is a sectional view of the coil taken on the line 2—2 in FIG. 1 showing the positioning of the driving magnet and the tensioning magnet with respect thereto;

Figure 4:
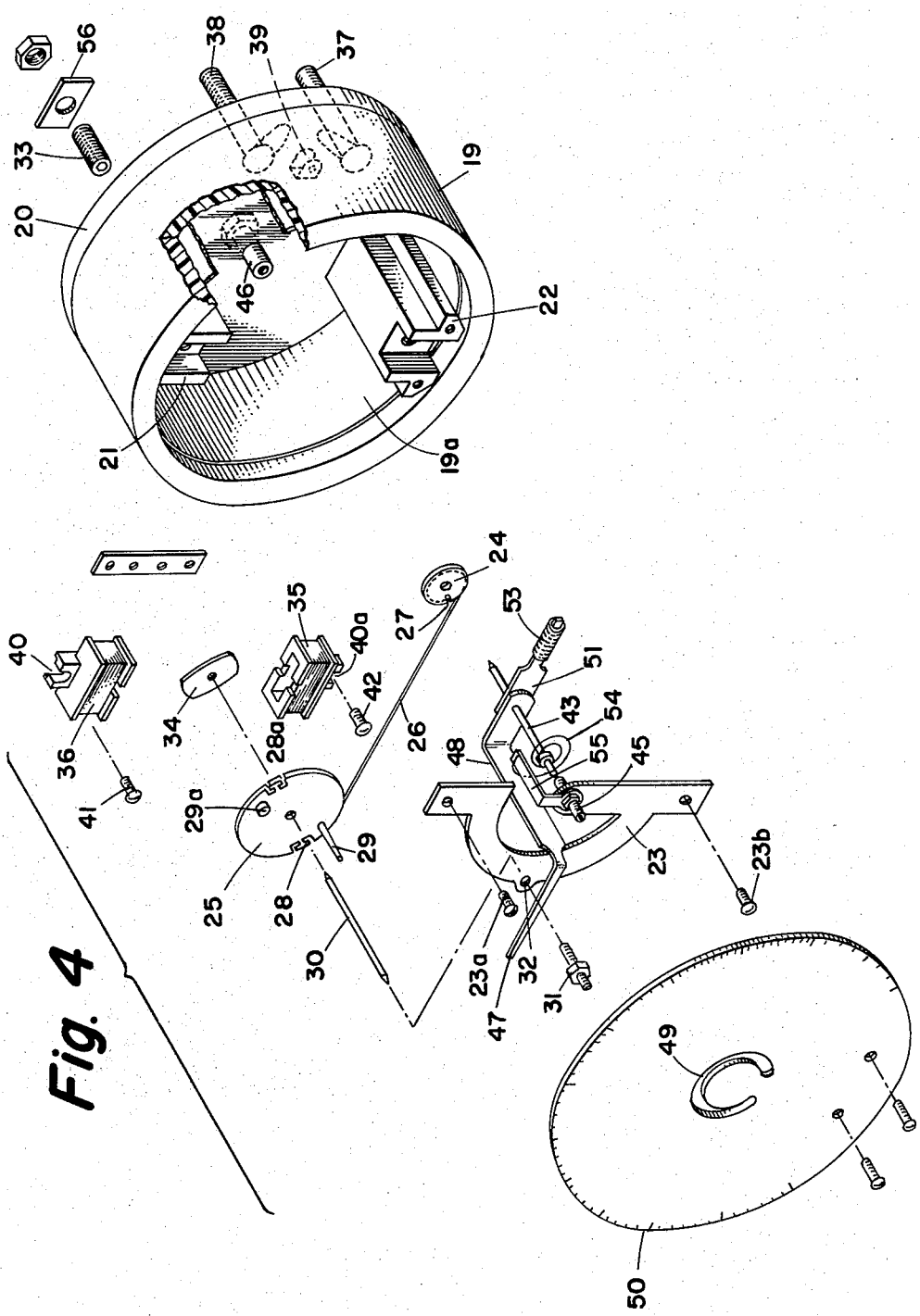

FIG. 3 diagrammatically illustrates the mechanism of FIGS. 1 and 2 together with the long scale and associated pointer but with a hair spring for the tensioning means mounted on the driving arbor; and FIG. 4 is an exploded view of a complete meter constructed in accordance with this invention.

Referring now to FIG. 1, the invention in one form has been shown as applied to an electrical meter of the long-scale type comprising a driving arbor assembly 1 and a driven arbor assembly 2. The driving arbor assembly 1 includes a driving arbor 3 on which there is secured a permanent magnet 4. The permanent magnet 4 may be considered a driving magnet since it is mounted on the driving arbor 3 for movement within the interior of a coil assembly 6 having two windings 6a and 6b. The magnet 4 is disposed within slots of this coil assembly, one of such slots 5 being shown in the assembly for the winding 6a. As will be later explained, change in an electric quantity will produce current flow through the coil assembly 6 for the development of a magnetic field which, in conjunction with the permanent magnet 4, develops a torque on the driving arbor 3 and a driving pulley 7. The driving pulley 7 is of large diameter compared with the diameter of a small driven pulley 9 secured to a driven arbor 8 from which there is a driving connection to a pointer 11 adapted to be driven along a long scale 16 forming part of the dial face. (Hereinafter the driving and driven pulleys are alterntaively referred to as driving and driven members.) The driving member 7 and the driven member 9 form a movement-multiplying means which includes a driving cord 10 secured at one end to driving member 7 and to the other end of driven member 9. Thus, a small movement of the driving member or pulley 7 produces a relatively large proportional movement of the driven member 9 and pointer 11.

If a belt were utilized between the driving member 7 and the driven member 9, it would be necessary to apply tension thereto in order to prevent slippage and to assure movement of the driven member 9 with a corresponding movement of the driving member 7. An endless belt under tension would then develop a pinching effect tending to pull the two arbors 3 and 8 toward each other with a resultant development of friction at the bearings provided by the ends of the two arbors which are respectively disposed in indentations in supporting members later to be described. If such an endless belt were not in tension, then a certain amount of slack develops with change in direction of movement and such slack gives rise to erratic indications of the pointer 11 on the long scale 16.

In accordance with the present invention, there are avoided entirely erratic and erroneous indications of the pointer 11 in reference to the scale 16, particularly in the critical region of operation, namely as the pointer 11 is moved from its zero position. (The pointer is illustrated in the zero position in FIG. 3.) This is accomplished by maintaining the driving cord 10 in tension in a specific, particular way. In the preferred form of the invention, there is applied to the driven arbor 8 a restoring force in the form of a coiled hairspring 12 having its inner end secured to the arbor 8 and the outer end secured to an adjustable bracket or supporting member 17. The hairspring 12, with the pointer 11 in its zero position, FIG. 3, is adjusted so that it develops a finite force on the arbor 8 in a direction tending to move the pointer 11 down scale from its zero position. This restoring force, as developed by hairspring 12, develops a torque on the arbor 8 and that force or torque is multiplied in the ratio of the diameter of the small pulley 9 to the diameter of the large pulley 7 and applied by way of the driving pulley 7 to the arbor 3.

The coiled hairspring 12 is preferably of Phospor bronze materal although other non-magnetic spring materials may be utilized. When the pointer is deflected from its zero position, the hairspring 12 stores energy by an increase in the diameter of the turns of the spring. Because the hairspring stores energy upon the unwinding of the turns of the spring, there is avoided the possibility that any dirt or oil between the turns of the hairspring will interfere with the maintenance of a force proportional to displacement.

By counterbalancing the finite value of the restoring force with a tensioning force, it will be seen that in the zero position the cord 10 is placed under tension and by an amount adequate to overcome the resistance of the cord 10 to bending about and around the driven pulley 9 and to assure the absence at any time of any slack between the driving and driven members 7 and 9.

It will be observed that in the clockwise movement of the pointer 11 the coil spring is unwound by the rotation of the arbor 8. Since the coiled hairspring 12 is made of Phosphor bronze, heat-treated to produce the desired degree of resilience, the spring will act in a direction to bias the arbor 8 in the counterclockwise direction, that is, to apply a restoring force tending to move the pointer 11 toward and beyond its zero position.

As mentioned above, the driving magnet 4 is disposed within the coil assembly 6. As best shown in FIG. 2, the windings 6a and 6b are connected so that they act cumulatively in developing a magnetic field which, for purposes of explanation, may be assumed to be leaving the coil assembly 6 at the uppermost part as viewed in FIG. 2, thus producing effectively a north pole at the top of the assembly and a south pole at the bottom of the assembly and as indicated by the letters "N" and "S." The driving magnet 4 is mounted on arbor 3 at a substantial angle to the direction of flux through the coil and preferably occupies the angular position illustrated in FIG. 2. Thus, when the coil assembly 6 is energized, the north pole, labeled "N," of permanent magnet 4 tends to move toward the north pole of the coil assembly and, of course, the south pole tends to move toward the south. Such an arrangement develops maximum torque when the permanent magnet 4 has its flux at right angles to the lines of force of the magnetic field developed by the coil assembly 6. Though the driving magnet 4 may, under the influence of the magnetic field represented by the arrows 14, be rotated through a relatively wide arc (from its illustrated position) until the north pole of magnet 4 is in alignment with the magnetic field represented by arrows 14, it is preferred to restrict its movement through about 60°–70° in the region where maximum torque is developed, thereby to achieve maximum sensitivity for a given magnitude of current flow. By now disposing in proximity to the driving magnet 4 a second permanent magnet 13 and in a position such as illustrated in FIG. 2, it will be seen that the reaction between the magnetic flux of the magnets 4 and 13 will develop on the driving arbor 3 a torque or force tending to rotate that arbor and its driving pulley 7 in a clockwise direction as viewed in FIG. 2. More particularly, as between the two permanent magnets 4 and 13, the driving magnet 4 tends to align itself with its south pole directly over the north pole of the tensioning magnet 13. In the operation now being described, the permanent driving magnet 4 may be considered a control magnet and for the reason that the torque developed by it on the driving pulley 7 and the cord 10 applies to the driven pulley 9 a torque of just that magnitude which balances the torque or force developed by the coiled hairspring 12 tending to move the pointer 11 down scale from its zero position. It will now be seen that the magnitude of the tensioning force developed by the permanent magnet 13 may be adjusted in magnitude by decreasing the angular separation between it and the driving magnet 4 with the pointer 11 in the zero position. Thus, by relatively adjusting the force developed by the coiled hairspring 12 on the driven arbor 8 and the tensioning force developed by the tensioning magnet 13 on the driving arbor 3, the tension on cord 10 may have any selected predetermined value. It need not be very great and its selected magnitude will be in relation to the desired sensitivity and always adequate to prevent erratic and erroneous indication of electric quantities as the pointer 11 is moved from its zero position. More particularly, the cord 10 preferably may be made of a natural or synthetic material. A relative fine silk cord has been found satisfactory and flexible metallic cords have been utilized. Regardless of the nature of the material, the problem of slack mentioned above is always present and the cord does offer some resistance to bending as it is wrapped about the driving pulley 7 and unwound from the driven pulley 9.

It will be observed that the coil or winding 6b is mounted on a coil support 6c having a slotted flange 6d. The coil form 6e is provided with a similar slotted flange 6f and, by means of suitable fastening screws, the coils or windings 6a and 6b may be adjusted with different separation distances between them thus to provide for an adjustment of the sensitivity of the meter. The sensitivity adjustment is adequate to cover different ranges of measurements for different meters scales which may be provided for the same basic meter movement. It will be further observed that the opposing faces of the coil forms 6c and 6e are provided with arbor-receiving slots, the slot 6g and the slot 6h being provided for the arbor 3.

Further reference is now made to the modification of

FIG. 3 in which there has been illustrated on the driving arbor 3 a coiled hairspring 18 mounted in the same manner as the spring 12 in relation to the arbor 8 except that the coiled hairspring 18 acts on the driving arbor 3 in the same direction as the torque developed by the driving magnet 4 and in opposition to the direction of rotation produced by the coiled hairspring 12, thus achieving the same result as that of magnet 13.

Now that the principles of the invention have been explained, there will be described in detail a complete meter as illustrated in FIG. 4

Referring now to FIG. 4, the meter movement is housed in a casing which includes a main body portion 19 and a back cover plate 20 suitably secured to the main body portion 19. A sheet of non-magnetic material 19a is provided for shielding purposes. Supporting members 21 and 22, which may be Phosphor bronze or other suitable non-magnetic material, are secured to the back cover plate by screws, which are not shown.

A bracket 23 for mounting the meter movement is secured in indentations in the supporting members 21 and 22 by means of mounting screws 23a and 23b. The movement itself differs slightly from the FIG. 1 embodiment in that small pulley 24 and large pulley 25 are mounted in side-by-side relationship.

A cord 26 is wrapped around the smaller pulley 24 and secured thereto at 27. The cord is secured to the large pulley at a notch in the pulley which forms a T-shaped projection 28. In order to balance the pulley 25, a similar notch 28a is provided on the other side of the pulley. In order to prevent counterclockwise rotation of large pulley 25 in the event of current reversal, a stop member 29 is provided. Counterclockwise rotation of the large pulley, which could pull cord 26 off of pulley 24, is prevented by reason of the stop member 29 coming into contact with bracket 23. A balancing protrusion 29a, of larger diameter but of equal volume with stop member 29, is provided to balance the pulley.

The large pulley 25 is mounted on an arbor 30. One pointed end of arbor 30 is supported in an indentation in the end of screw 31 which extends through the hole 32 in bracket 23. The other end of arbor 30 is similarly mounted in an indentation in the end of screw 33 which protrudes through the back cover plate 20. The screws 31 and 33 provide means for adjusting the arbor 30.

Also mounted on the arbor 30 is a driving magnet 34. Driving magnet 34 is mounted for rotation in a slot in the coil assembly formed by the coils 35 and 36 wound on suitable coil forms.

Electrical connections are made to the coils by means of the terminal screws 37 and 38 which protrude through the back cover plate of the instrument. Although the coils 35 and 36 may be connected in parallel if desired, in the embodiment shown there is provided a terminal 39 for connecting the two coils in series. One end of each of the coils 35 and 36 is connected to the terminal 39 for this purpose. The other ends of coils 35 and 36 are respectively connected to terminal screws 37 and 38 to provide an external connection to the coils.

The coil forms on which coils 35 and 36 are wound are provided with adjusting slots 40 and 40a. Screws 41 and 42 extend through these adjusting slots to secure the coil forms to the back cover plate. The adjusting slots 40 and 40a provide means for adjusting the spacing between the coils 35 and 36 to change the sensitivity of the meter.

Referring now to the driven arbor assembly, the small pulley 24 is mounted on an arbor 43. One end of arbor 43 is mounted in an indentation in the end of screw 45 which extends through the bracket 23. The other end of arbor 43 is mounted in an indentation in screw 46 which extends through the back cover plate. A pointer 47 is mounted on arbor 43. Pointer 47 has a portion 48 which extends through the arcuate opening in bracket 23 and through an arcuate opening 49 in the dial face 50 so that the pointer 47 may sweep up scale over the dial face 50.

Also mounted on arbor 43 is a counterbalancing member 51. A coiled spring 53 is positioned on member 51 to provide the correct counterbalancing weight for pointer 47.

In order to apply a restoring force to arbor 43, a coiled hairspring 54 is secured at one end to the arbor and is secured at the other end to a bracket 55 which is mounted, by means of screw 45, to the bracket 23.

In order to apply a tensioning force to the driving arbor, a tensioning magnet 56 is mounted on the outside of the back cover plate 20. The flux of tensioning magnet 56 interacts with the flux of driving magnet 34 to exert a clockwise torque on the driving arbor assembly. The embodiment shown in FIG. 4 differs from that shown in FIG. 1 in that the tensioning magnet 56 is positioned at the rear of the meter. It will be noted that in this position the tensioning magnet 56 is closer to the driving magnet 34. Because of this, the tensioning magnet 56 may be made smaller than the tensioning magnet 13 in the FIG. 1 embodiment.

The operation of the meter of FIG. 4 is the same as that described with reference to the FIG. 1 embodiment. When the pointer 47 is in the zero position, the restoring force applied by hairspring 54 to the driven arbor assembly is balanced by the tensioning force applied to the driving arbor assembly by the interaction of flux between tensioning magnet 56 and driving magnet 34. The two opposing forces applied to the driving arbor assembly and the driven arbor assembly maintain the cord 26 in tension so that when the coils 35 and 36 are energized the pointer 47 will immediately sweep up scale with no erratic indications. Furthermore, since the tensioning magnet 56 together with hairspring 54 maintains the cord in tension, there is avoided the necessity of applying an initial force for bending the cord 26 around the pulleys. This also avoids erratic initial scale movements.

While particular embodiments of the invention have been shown and described, it will, of course, be understood that various other modifications may be made without departing from the principles of the invention. The appended claims are, therefore, intended to cover any such modifications within the true spirit and scope of the invention.

What is claimed is:
1. An electrical meter comprising
   a driven arbor,
   a driving arbor, said arbors being in parallel axes,
   multiplying driving means for said arbors for multiplying the rotation of said driven arbor for a given rotation of said driving arbor including:
      a pulley mounted on said driven arbor,
      a driving member mounted on said driving arbor and having an edge rotatable about the driving arbor, said edge moving in an arcuate path about said driving arbor, the radius of said arcuate path being greater than the radius of said pulley,
      a single pliant driving cord affixed at one end to the periphery of said pulley and at the other end to said edge of said driving member,
   an extended scale,
   a pointer having a driving connection with said driven arbor and movable thereby over said scale,
   means for applying a restoring torque in a downscale direction to said driven arbor, which torque has a finite value with said pointer in its zero position for maintaining said driving cord in tension with said pointer in said zero position on said scale,
   cord tensioning means for applying to said driving arbor a torque in an upscale direction which through said cord counterbalances said finite value of said restoring torque and concurrently maintains said cord in tension,
   an electrical coil, and an armature mounted on said driving arbor for applying torque to said driving arbor thereby to move said pointer along said scale in response to the application of electrical energy to said electrical coil.

2. An extended scale electrical meter comprising
a rotatably mounted driving arbor,
a driving magnet mounted on said driving arbor,
a coil responsive to an electrical quantity for developing a magnetic field with the magnetic flux of said driving magnet for applying a driving torque to said driving arbor,
a driven arbor lying in an axis parallel to the axis of said driving arbor,
a pointer mounted on said driven arbor,
a large pulley mounted on said driving arbor,
a small pulley mounted on said driven arbor,
a single pliant cord secured at one end to said large pulley and secured at the other end to said small pulley for producing a large incremental movement of said pointer with a smaller incremental movement of said driving arbor,
means for applying a restoring torque in a downscale direction to said driven arbor, which torque has a finite value with said pointer in its zero position for maintaining said driving cord in tension with said pointer in said zero position on said scale,
cord tensioning means for applying to said driving arbor a torque in an upscale direction which through said cord counterbalances said finite value of said restoring torque and concurrently maintains said cord in tension.

3. The meter recited in claim 2 wherein said cord tensioning means includes a tensioning magnet disposed for reaction of its flux with the flux of said driving magnet for applying said cord tensioning means to said driving arbor in the same direction as said driving torque to maintain said cord in tension and in which said restoring torque is applied to said driven arbor.

4. The meter recited in claim 3 wherein said means for applying said restoring torque includes a hairspring having one end secured to said driven arbor for applying said restoring torque to said driven arbor in a direction opposite to that of said driving torque.

5. The meter recited in claim 2 wherein said cord tensioning means includes a hairspring secured at one end to said driving arbor for applying a tensioning torque to said driving arbor.

6. An extended scale electrical meter comprising
a rotatably mounted driving arbor,
a driving magnet mounted on said driving arbor,
a coil disposed for reaction of its flux with the flux of said driving magnet for applying a driving torque on said driving arbor in proportion to the magnitude of flow of current through said coil,
a driven arbor lying in an axis parallel to the axis of said driving arbor,
a pointer mounted on said driven arbor,
a large pulley mounted on said driving arbor,
a smaller pulley mounted on said driven arbor,
a single pliant cord secured at one end to said large pulley and secured at the other end to said smaller pulley for producing a large incremental movement of said pointer with a smaller incremental movement of said driving arbor,
a hairspring for applying a restoring torque in a downscale direction to said driven arbor, which torque has a finite value with said pointer in its zero position for maintaining said driving cord in tension with said pointer in said zero position on said scale, and;
a tensioning magnet disposed for reaction of its flux with the flux of said driving magnet for applying a tensioning torque to said driving arbor in the same direction as said driving torque to maintain said cord in tension in a direction tending to move said pointer in its normal direction of movement.

7. The meter recited in claim 1 wherein said armature includes a first permanent magnet, and said cord tensioning means includes a second permanent magnet supported in proximity to said first permanent magnet with the polarities thereof so disposed as to produce a reaction between them for developing a torque on said driving arbor in an upscale direction to counterbalance said finite value of said restoring torque with said pointer in its said zero position thereby to maintain said cord in tension.

8. The meter recited in claim 1 wherein said means for applying a restoring torque includes a restoring hairspring having one end secured to said driven arbor and the other adjustably secured for applying a finite torque to said driven arbor of a predetermined finite value to move said pointer in a downscale direction.

9. The meter recited in claim 1 wherein said cord tensioning means includes a hairspring with one end having a driving connection with said driving arbor and the other end fixedly supported for applying to said driving arbor in an upscale direction a torque which through said cord counterbalances said finite value of said restoring torque and concurrently maintains said cord in tension.

References Cited by the Examiner

UNITED STATES PATENTS

| | | | |
|---|---|---|---|
| 2,137,066 | 11/1938 | Smith | 324—154 X |
| 2,395,784 | 2/1946 | Honegger | 74—108 X |
| 2,930,235 | 3/1960 | Oppenheim | 74—95 X |

FOREIGN PATENTS

| | | |
|---|---|---|
| 660,894 | 11/1951 | Great Britain. |
| 121,856 | 8/1927 | Switzerland. |

References Cited by the Applicant

UNITED STATES PATENTS

| | | |
|---|---|---|
| 455,855 | 7/1891 | Eldredge. |
| 1,258,284 | 3/1918 | Weinrich. |
| 2,074,117 | 3/1937 | Ross. |
| 2,788,491 | 4/1957 | Millar. |
| 2,817,816 | 12/1957 | Medlar. |
| 2,989,870 | 6/1961 | Stahl. |
| 2,866,939 | 12/1958 | Fort. |

WALTER L. CARLSON, *Primary Examiner.*

RUDOLPH V. ROLINEC, *Examiner.*